(12) United States Patent
Beams et al.

(10) Patent No.: US 8,744,700 B2
(45) Date of Patent: Jun. 3, 2014

(54) REVERSING VEHICLE REMOTE TELEMATICS DETECTION

(76) Inventors: Darren Beams, Oakville (CA); Neil Cawse, Oakville (CA)

( * ) Notice: Subject to any disclaimer, the term of this patent is extended or adjusted under 35 U.S.C. 154(b) by 0 days.

(21) Appl. No.: 13/506,525

(22) Filed: Apr. 25, 2012

(65) Prior Publication Data

US 2013/0289837 A1    Oct. 31, 2013

(51) Int. Cl.
*B60W 10/06* (2006.01)
*B60W 10/11* (2012.01)
*B60W 30/18* (2012.01)
*G01C 21/00* (2006.01)
*G01C 21/10* (2006.01)
*G01C 21/16* (2006.01)
*G01C 23/00* (2006.01)
*G05D 13/00* (2006.01)

(52) U.S. Cl.
CPC ... *B60W 30/18027* (2013.01); *B60W 30/18036* (2013.01); *B60W 30/18045* (2013.01)
USPC ........ 701/51; 701/7; 701/70; 701/74; 701/79; 701/93; 701/94; 701/95; 701/96; 701/110; 701/119; 701/121; 701/502; 701/507

(58) Field of Classification Search
CPC .............. B60W 30/18027; B60W 30/18036; B60W 30/18045; G01C 21/00; G01C 21/10; G01C 21/16; G01C 23/00; G05D 13/00
USPC ............... 701/7, 70, 74, 79, 93–96, 110, 119, 701/121, 502, 507
See application file for complete search history.

(56) References Cited

U.S. PATENT DOCUMENTS

| | | | |
|---|---|---|---|
| 5,267,166 A * | 11/1993 | Takata et al. | 701/71 |
| 5,686,662 A * | 11/1997 | Tracht et al. | 73/121 |
| 6,332,354 B1 * | 12/2001 | Lalor et al. | 73/121 |
| 6,618,672 B2 * | 9/2003 | Sasaki et al. | 701/301 |
| 6,836,729 B2 * | 12/2004 | Tanaka et al. | 701/472 |
| 6,876,920 B1 * | 4/2005 | Mailer | 701/470 |
| 6,944,543 B2 * | 9/2005 | Prakah-Asante et al. | 701/301 |
| 7,308,352 B2 * | 12/2007 | Wang et al. | 701/70 |
| 7,386,381 B2 * | 6/2008 | Matsushima et al. | 701/51 |
| 7,613,560 B2 * | 11/2009 | Nishi et al. | 701/93 |
| 7,813,855 B2 * | 10/2010 | Watanabe et al. | 701/41 |
| 7,894,951 B2 * | 2/2011 | Norris et al. | 701/36 |
| 8,019,514 B2 * | 9/2011 | Yuet et al. | 701/50 |
| 8,255,121 B2 * | 8/2012 | Zagorski et al. | 701/45 |
| 8,275,528 B2 * | 9/2012 | Kresse | 701/54 |
| 2006/0287826 A1 * | 12/2006 | Shimizu et al. | 701/216 |
| 2007/0005213 A1 * | 1/2007 | Nou et al. | 701/70 |
| 2008/0133100 A1 * | 6/2008 | Takahashi et al. | 701/74 |
| 2009/0187300 A1 * | 7/2009 | Everitt et al. | 701/29 |
| 2010/0174477 A1 * | 7/2010 | Ozaki et al. | 701/200 |
| 2010/0222977 A1 * | 9/2010 | Tan et al. | 701/70 |
| 2010/0228460 A1 * | 9/2010 | Saito | 701/70 |

* cited by examiner

*Primary Examiner* — Mary Cheung
*Assistant Examiner* — Atul Trivedi

(57) ABSTRACT

A device comprising a processor that detects an autonomously sensed change in a vehicle's operational state from an initial state characterized by a sensed vehicle speed equal to about 0; to an immediately succeeding vehicle state characterized by sensed vehicle speed being greater than about 0 and, verification from a reverse operating mode sensor that longitudinal vehicle speed is in a reverse direction; and presumptively signals the thusly detected change of vehicle operational state as an instance of reverse operation of the associated vehicle.

43 Claims, 3 Drawing Sheets

REVERSING VEHICLE REMOTE TELEMATICS DETECTION

BACKGROUND OF THE PRESENT INVENTION

ABS (anti-lock braking systems) can experience situational problems when an ABS equipped vehicle is operated in reverse. This is due in part to the conventional "front-loading-bias" of typical automotive braking designs (i.e. front brakes by design, apply greater braking force (higher pressure) than the rear brakes—to compensate for the fact that front tires are much more likely to be heavily loaded during stops from a forward direction of vehicle travel). However, when applying brakes to slow the rearward travel of the vehicle, the front tires may lock up (because during reverse operation most of the vehicle "weight" has transferred to the rear wheels). If the ABS can't detect that the vehicle is travelling in reverse under such apparent "front wheel locking" conditions, then a driver's ability to deploy the required degree of braking is impeded, (i.e. the action of the ABS-controlled brake pedal resists depression and pulsates rapidly), and on steep inclines the vehicle speed can actually increase uncontrollably due to the lack of adequate braking to counter gravitational acceleration. One solution to this problem is disclosed in U.S. Pat. No. 5,267,166, which teaches utilizing vehicle speed, longitudinal acceleration and gravitational acceleration data to control ABS operations and to thereby militate against such problems when the vehicle is being operated in reverse.

This ABS related problem although distressing, tends to arise only in relatively rare (and often relatively innocuous) circumstances.

A far more problematic issue is that the societal costs of accidents arising out of operating vehicles in reverse generally, are entirely disproportionate, and only very rarely have anything to do with the aforementioned ABS problem.

SwissRE Commercial Insurance has published an article which reveals that: "millions of miles are driven each year and most of these miles are driven going forward. Although the majority of accidents occur while vehicles are going forward, approximately 30 percent of all accidents occur when vehicles are moving in reverse. Based on the high frequency of these accidents and the facts that all backing accidents are often preventable, emphasis must be placed on safe backing procedures. Accidents that occur when a vehicle is going in reverse are costly to companies. While the most frequent of claims involve property damage, bodily injury to individuals occurs as well. The element of risk resulting in bodily injury is ever present when backing any vehicle. This is a major factor when considering why the total cost of backing accidents is so high".

Accordingly, managing all aspects of how vehicles are operated in reverse remains an important social and technological issue.

SUMMARY OF THE PRESENT INVENTION

In accordance with the present invention, there is provided a reverse detection algorithm and reverse-detection associated software, apparatus, methods and systems for variously detecting and responding to reverse operation of a motor vehicle, and in particular a reverse detection algorithm for use in recording (and associated circumstance logging), alerting, or variously evaluating reverse operation of a motor vehicle.

One embodiment of a device according to the present invention comprises a processor that detects an autonomously sensed change in a vehicle's operational state. More specifically the device detects a change from an initial state, (characterized by a sensed vehicle speed equal to about 0), to an immediately succeeding vehicle state, (characterized by the sensed vehicle speed being greater than about 0; and, verification from a reverse operating mode sensor that longitudinal vehicle speed is in a reverse direction). Upon detection of circumstances satisfying these characterizations, the device presumptively signals the thusly detected change of vehicle operational state as an instance of reverse operation of the vehicle.

In a more elaborate aspect of the above described embodiment, the immediately succeeding vehicle state is further characterized by the sensed vehicle speed remaining greater than about 0 for a predetermined uninterrupted period of time. This feature and the predetermination of the extent of the period of time are advantageous in discriminating substantial reversing vehicle operations of greater potential significance from transient events that are less likely to be of interest/impact. Similarly, but in yet another aspect of the foregoing, the immediately succeeding vehicle state can be further characterized by detecting that the sensed vehicle speed does not exceed a predetermined maximum speed. Within the expected range of driving norms, there are vehicle speeds which are inherently outside reverse vehicle operations—and this further characterization advantageously excludes (on a probabilistic basis) such excessive speed circumstances from signalling a reverse operation of the vehicle by the present device. For example, a vehicle moving forward down a steep incline may be decelerating by some measures, but still moving faster than would be reasonably expected of a vehicle that was being operated in reverse. This, for example, can be the case when the immediately succeeding vehicle state is further characterized by a reverse operating mode sensor verification that is provided by negatively-valued average sensed vehicle acceleration along the vehicle's longitudinal axis of travel, (although it is possible to compensate for gravimetric acceleration to offset the apparent longitudinal acceleration). Alternatively of course, an alternative reverse mode indication could be obtained from a reverse gear train engagement sensor (PRNDL)—although, taken in isolation, such a sensor does not necessarily signify vehicular motion.

The combination of the initial change from a speed of about 0 to some greater speed, with both these further characterizations of sensed vehicle speed, (remaining greater than about 0 for a predetermined uninterrupted period of time; and, not exceeding a predetermined maximum speed) is particularly advantageous.

The mode for detection of the change from the characterized initial and next states, in accordance with the present invention is flexible. For example, the informatics processor may employ logic state comparators to detect an autonomously sensed change in a vehicle's operational state. Again, by way of example, the comparison might be based on an initial state characterized by sensed vehicle speed equal to about 0 being TRUE, transitioning to an immediately succeeding vehicle state characterized by sensed vehicle speed greater than 0 being TRUE (or the more general corollary, vehicle speed being about 0 as false); and, a reverse operating mode sensor verification that longitudinal vehicle speed is in a reverse direction being TRUE. Under conditions satisfying this logic, the device presumptively signals the thusly detected change of vehicle operational state as an instance of reverse operation of the vehicle. As indicated previously, the immediately succeeding vehicle state can then be variously further characterized: with the sensed vehicle speed remaining greater than about 0 for a predetermined uninterrupted period of time being TRUE; with the sensed vehicle speed greater than about 0 and not exceeding a predetermined maximum speed, being TRUE; with the sensed vehicle speed remaining greater than about 0 for a predetermined uninterrupted period of time and not exceeding a predetermined maximum speed, being TRUE.

Alternatively, a device according to the present invention may employ a processor that calculates change in speed from said initial speed state of about 0 to speed in range greater than about 0 but less than the predetermined maximum for an uninterrupted predetermined period of time with an average negative acceleration, to detect the change in state.

In any case, it is preferred that a device according to the present invention employ its processor to initiate a new change of state detection cycle in response to detecting speed=about 0, or indeed upon any other failure of the characterizing conditions to be satisfied.

In one aspect of the present invention the aforementioned processor is associated with a vehicular telematics device—and more particularly an automotive application thereof, (such as in light, medium, heavy trucks, (with or without associated trailers), buses, cars, on or off-road vehicles, and whether powered by diesel, gasoline or other hydrocarbons, or electricity or some form of duel fuel or hybrid power plant).

In such a vehicular telematics device, diverse data telemetry connectors/connections may be adapted to connect to processor telemetry inputs or outputs (with either of same including, and without implying any particular limitation, physical channels such as: electrical, electromagnetic radio, optical, infrared acoustic etc.) Associated inputs include those associated with vehicular sensors (which may be more or less "fixed" to the vehicle or removable or even portable (e.g. "personal devices, such as smartphones, or deployable sensor packages), and the functionality of the present invention can be variously implemented/distributed, (e.g. even integrated within the sensor itself). In a preferred form of the present invention, the telematics device (whether an integrated OEM or aftermarket device) is variously connected through the vehicle's on-board diagnostic and control network (where it can deal in raw sensor telemetry and/or vehicle network processed telemetry, with either or both being variously passed through a vehicle network associated communications bus.

Physical channel connections with peripheral vehicular telematics device embodiments, for example: through an OBD port on vehicles so equipped; through break-out boxes, cables, harnesses, connection adapters and the like adapted for connecting to the vehicle's electronic network; through wireless data transmitters: optical (e.g. Infrared), Bluetooth, Zigbee, RFID, NFR etc. Data transfer connections can be variously facilitated using protocol recognition schemes, protocol converters and the like.

By way of example of the foregoing, a peripheral (relative to the vehicular network) telematics device according to the present invention may include self-integrated sensors such as GPS (or other location-sensing) modules; accelerometers and the like. In addition such a device may be associated with (i.e. be connected or adapted to be connected) with wireless communications devices, such as transmitters, receivers, or transceivers—and these may be integrated into the peripheral telematics device. For example, assuming the instance of such a peripheral on-board telematics device adapted to operate as an intermediary between an OEM on-board vehicle network and a remote fleet management network, then the system may include radio (e.g. Wi-Fi or cellular modem) components, and gateway components, each variously associated with one another to provide a connection with a remote processor and a vehicle information monitoring/reporting/display facility. Such a telematics device can also be associated (i.e. operably connected or adapted to be so connected) with data recording memory devices, (which can be local or remote, (i.e. on-board or extravehicular)). Such a memory can be variously associated with processor inputs and/or outputs, (with the later including either or both processor-processed telemetry and other derivative information), data.

DETAILED DESCRIPTION OF THE PRESENT INVENTION

The following is a more detailed description of certain aspects and embodiments of the present invention, and over the course of same reference will be made to the appended drawings.

INTRODUCTION TO THE DRAWINGS

Figure 1:
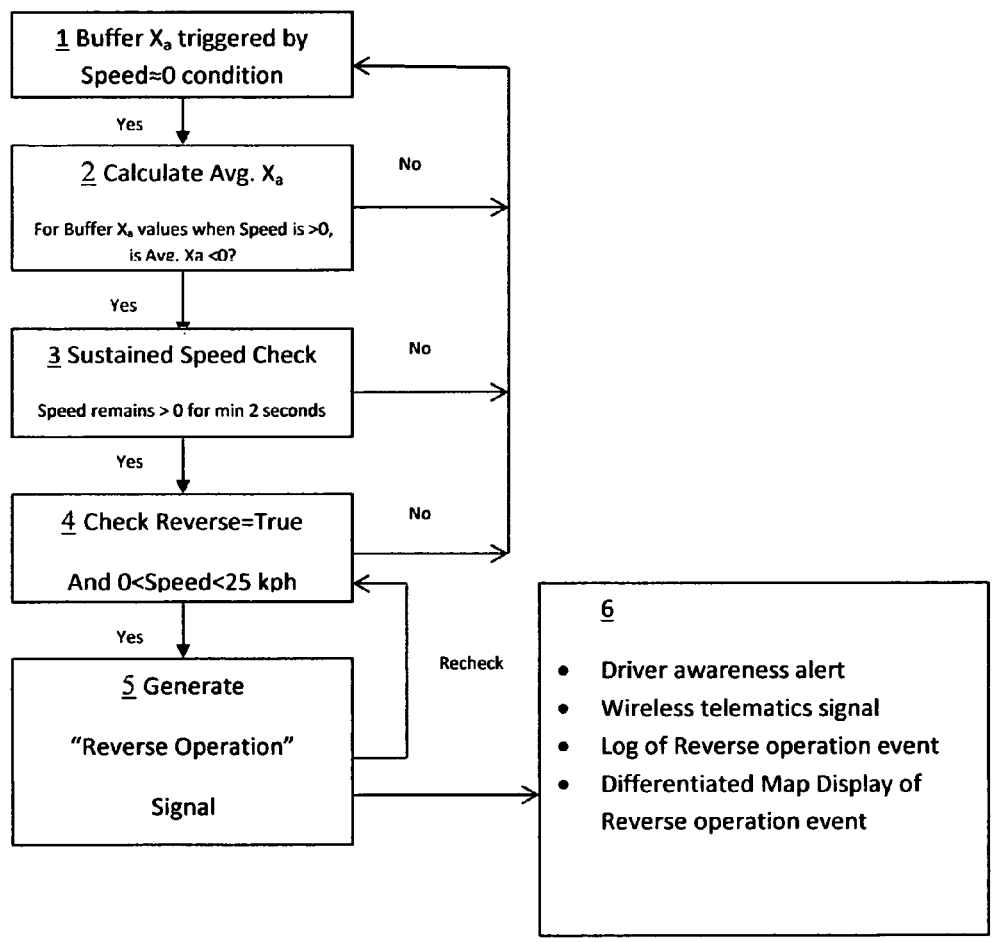
FIG. 1 is a schematic representation of the processing carried out in accordance with one aspect of the invention.

Referring now to FIG. 1 of the drawings, there is illustrated a series of processing steps in accordance with the present inventions method for detecting instances of vehicle reverse operation. In general, boxes number 1 through 6 illustrate various steps associated with detecting an autonomously sensed change in a vehicle's operational state from an initial state characterized by a sensed vehicle speed equal to about 0 to an immediately succeeding vehicle state characterized by a sensed vehicle speed being greater than about 0; and, verifying from a reverse operating mode sensor that longitudinal vehicle speed is in a reverse direction, and presumptively signaling said detected change of vehicle operational state as an instance of reverse operation of said vehicle. The vehicle speed is preferably determined from a vehicle speed sensor (see FIG. 2 and its associated written description for additional detail in this connection).

Reference to "about 0" in the context of sensing speeds in accordance with the present invention, is to accommodate sensed speed response latency and resolution issues—since for example, a vehicle may actually stop, but the sensed speed may not register same as speed reaching 0. Accordingly, very low sensed speeds (for example speeds of less than three to even two or less kilometers per hour) can satisfy the requirement for speeds of about 0.

As indicated in box 1, once the sensed vehicle speed is about 0, the vehicle acceleration in the X direction (the forward-reverse direction of normal vehicle travel), is collected in a buffer memory.

Presumptive detection of reverse vehicle operation includes identification of an immediately succeeding vehicle state being further characterized by the aforementioned sensed vehicle speed remaining greater than about 0, subject to verification by an average negative (i.e. reverse) X direction acceleration when sensed vehicle speed increases from about 0 (see box 2) and remains so for a predetermined uninterrupted period of time, (e.g. 2 seconds or more—see box 3).

The presumption in that last preceding paragraph is then checked based on the sensed vehicle speed not exceeding a predetermined maximum speed, or more precisely in accordance with box 4, wherein the vehicle speed remains greater than about 0 and less than a predetermined maximum speed, in this case, of about 25 kmph.

Subject to the satisfaction of the conditions and validations called for in boxes 1 through 4, the method calls for the generation of a reverse operation indicative signal in box 5. That signal may then employed to drive succeeding method steps variously related to the subsequent uses exemplified in box 6.

The present invention extends to computer-readable storage media storing computer-readable program code for implementing the various methods recited herein.

Figure 2:
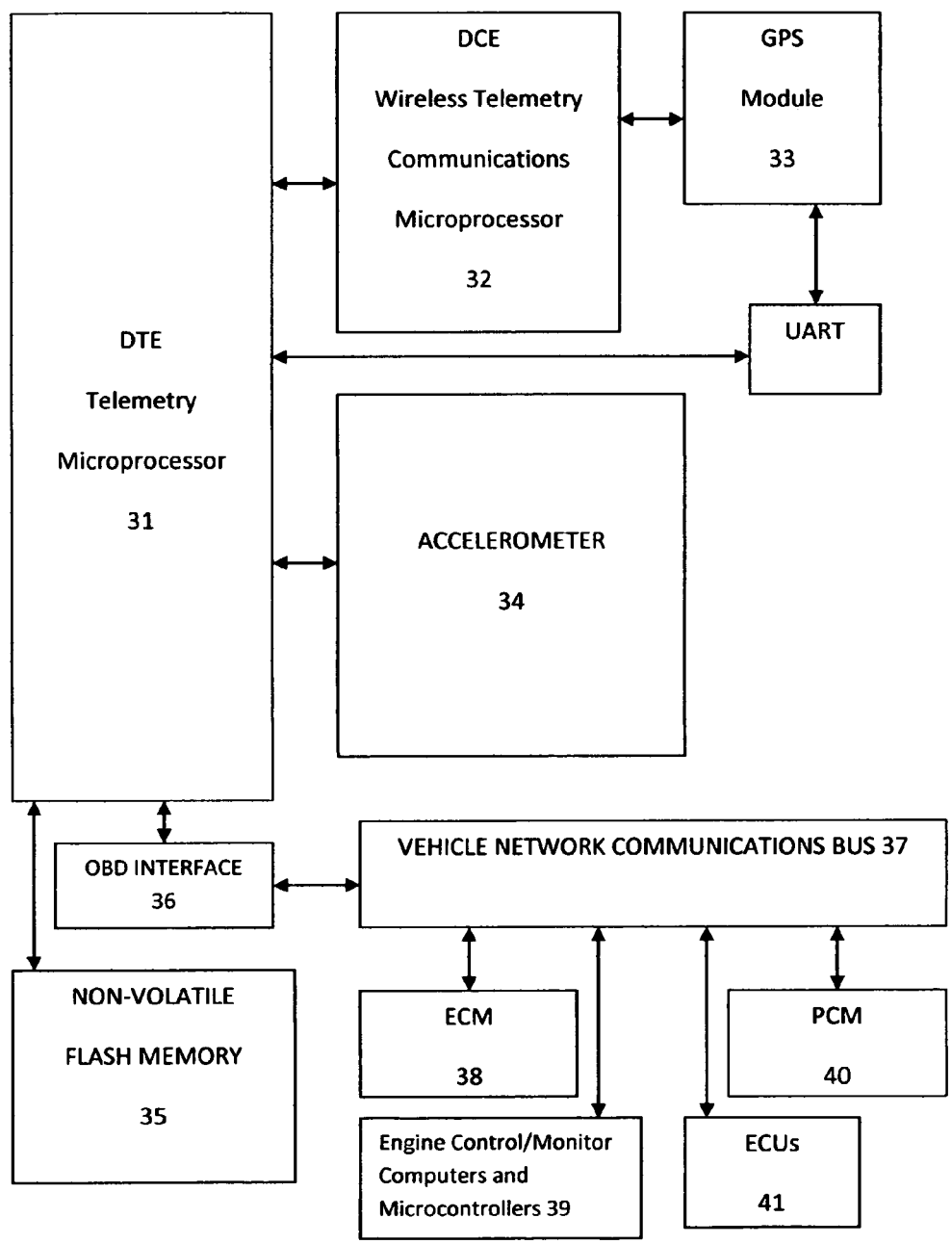
FIG. 2 is a schematic of an on-board telematics device useful in the practice of the present invention.

Referring now to FIG. 2 of the drawings, there is illustrated an on-board vehicular telemetry system, including a telematics device comprising a DTE (data terminal equipment) telemetry microprocessor 31 incorporating an integral functionally-implemented trigger unit; a DCE (data communications equipment) wireless telemetry communications microprocessor 32; a GPS module 33; an accelerometer 34; a non-volatile flash memory 35 and provision for an OBD interface 36 with a vehicle network communications bus 37. Bus 36 is in turn electrically linked in communicating relation with an associated vehicle's ECM 38 and PCM 40, and their respective variously associated engine control/monitor computers and microcontrollers 39 and ECU's 41.

Modern vehicle speed sensors (sometimes abbreviated to "VSS") are typically electronic sensors, and as in accordance with at least one embodiment of the present invention, are variously associated with bus 36, ECM 38, PCM 40, microcontrollers 39 and or ECU's 41. In speedometer designs derived from earlier eddy-current models, a rotation sensor mounted in the transmission delivers a series of electronic pulses whose frequency corresponds to the (average) rotational speed of the driveshaft, and therefore the vehicle's speed, assuming the wheels have full traction. The sensor is typically a set of one or more magnets mounted on the output shaft or, in the case of transaxle power trains, the differential crown-wheel, or a toothed metal disk positioned between a magnet and a magnetic field sensor: and in any case, as the rotating part turns, the magnets or teeth pass beneath the sensor, producing a series of pulses in the sensor signal output.

Other electronic vehicle speed sensors can also more or less directly, or by proxy, measure how fast the vehicle is running. Basically, these other vehicle speed sensors are of two general types:

One such type of vehicle speed sensor is the engine speed sensor. Engine speed sensors are usually made up of a toothed metal disk mounted on the crankshaft and a fixed detector covering a magnetic coil where the current pulses passes through. This type of speed sensors obtains impulses from the toothed signal crankshaft and delivers these impulses to the engine ECU (electronic control unit), which then calculates the engine speed through the impulses. Vehicle speed can then be calculated from this based on engine speed, transmission and differential gearing and tire size—although the speed signal delivered by engine speed sensors are more typically used by the engine ECU in controlling engine timing, fuel delivery and automatic transmission shift points.

The other, and the more typical type of such a vehicle speed sensor, is the wheel speed sensor which is employed on vehicles equipped with an anti-lock braking system, commonly known as ABS. The wheel speed sensor measures the rotational speed of the wheel and feeds the data to the processing unit of the ABS. The speed sensor does this by picking up impulses from the wheel's toothed signal rotor. The signal from the wheel speed sensor tells the ABS ECU whether the vehicles' wheel is locking or not, and in response, activating the antilock braking system. Pulses from this wheel speed sensor can also, however, be converted to a vehicle speed signal which in turn can be displayed as such on an electronically-controlled, analog-style needle or a digital display. This pulse signal is also used for a variety of other purposes by the ECU or full-vehicle control system, e.g. actuating traction control, calculating average trip speed, or more mundanely to increment the odometer in place of it being turned directly by the speedometer cable.

Such wheel speed sensors are commonly of one of two types: a variable reluctance type, and a magneto-resistive type. Variable reluctance wheel speed sensors produce their own voltage when the wheel is rotating, and the AC output voltage is proportional to the speed of wheel rotation. Magneto-resistive wheel speed sensors are becoming more typical in this application. This type of sensor relies on a 12 volts DC power supply from the ABS computer—although it also provides for a small power supply returning approximately 0.90 volts back to that computer. This reading occurs when the valley of the tone wheel is aligned with the magnet of the sensor. As the tone wheel tooth approaches the magnet of the sensor; signal voltage should increase to approximately 1.65 volts. The ABS computer measures the digital voltage and amperage output signal from this wheel speed sensor to calculate the vehicle's wheel speed.

Microprocessor 31 is interconnected with microprocessor 32 (such as a Leon 100 module available from ublox), using a RS-232 serial interface. Microprocessor 32 is interconnected with GPS module 33 (such as Neo-5 ROM-based GPS receiver module also available from ublox), using for example an I2C compatible display data channel (DDC) serial communications interface.

In operation according to the present invention, sensed vehicle acceleration and the vehicle road speed (from the engine bus (whether an ODBII or other bus)) are used to presumptively detect reverse vehicle operation. The basic logic steps employed in microprocessor 31, are as follows:

1. While waiting for sensed vehicle movement (i.e. when sensed vehicle speed is equal to about 0), constantly cycles a buffer of about 1 elapsed second's worth of X accelerometer data;
2. When the vehicle starts moving (engine based road speed goes from about 0 to >about 0), take an average of the X accelerometer data, if that average is a negative number it is possible that the vehicle may be operating in reverse;
3. If the vehicle's road speed then remains above about 0 for 2 seconds (i.e. after step 2 above) there is a further presumption that the vehicle is being operated in reverse; however, if road speed goes back to about 0 within the 2 second period, the presumption fails and processing returns to step 1 above;
4. If the reverse presumption from step 3 survives the 2 second test then the presumption remains valid unless the road speed goes above 25 km/h—in which case the presumption is deemed to be a false reverse detect and the processing reverts to step 1 above.

In the event that the presumption of reverse operation detection survives steps 1 through 4, microprocessor 31 then initiates the generation of a reverse operation detection signal. Depending then on the use(s) to which the signal is put, signal information may be variously logged as for example in memory 35, or wirelessly processed as for example through DCE microprocessor 32 and an associated (not shown in FIG. 2) transmitter, or router (e.g. WiFi), or a cellular modem, as the case may be.

Accelerometer 34 is a linear MEMS accelerometer provided in an LGA package and is an ultra-compact low-power three axes linear accelerometer, (with that includes a sensing element and an IC interface able to take the information from the sensing element and to provide the measured acceleration to the external world through I2C/SPI serial interface. This device is commercially from ST, as model LIS302DL and has a user-selectable full scale of ±2 g and ±8 g and is capable of measuring accelerations with an output data rate of 100 Hz or 400 Hz.

This device is a surface micro-machined accelerometer which employs suspended silicon structures that are attached to the substrate at a few points called anchors and are free to move in the direction of the sensed acceleration. When acceleration is applied to the sensor the proof mass displaces from its nominal position, causing an imbalance in the capacitive half-bridge. This imbalance is measured using charge integration in response to a voltage pulse applied to the sense capacitor. At steady state the nominal value of the capacitors are few pico Farad and when acceleration is applied the maximum variation of the capacitive load is of few femto Farad. The complete measurement chain is composed by a low-noise capacitive amplifier which converts into an analog voltage the capacitive unbalancing of the MEMS sensor and by and by analog-to-digital converters. The acceleration data may be accessed through an I2C/SPI interface thus making the device particularly suitable for direct interfacing with an application microcontroller. Data synchronization in digital system employing the device is made simpler through the usage of the Data-Ready signal (RDY) which indicates when a new set of measured acceleration data is available thus simplifying data synchronization in digital system employing the device itself.

"X" direction acceleration data detected by accelerometer 34 is stored in accordance with this embodiment of the present invention in a buffer in a microprocessor 31 associated flash memory. Note the embodiment in FIG. 2 includes a further flash memory 35, useful for data logging. It is an Atmel Corporation 32 Mb non-volatile Flash Memory Store, having: a Main Data Memory adapted to store low resolution data log events; and, a high resolution Data Memory Buffer that records accident and other data following associated accelerometer triggered events. In accordance with one aspect of the present invention, memory 35 provides this two tiered memory for recording vehicular telematics data from processor 31 at a first rate in a first log and at a second higher rate in a second log, and records amongst other data log entries, instances of reverse operation at high resolution in the second log.

Figure 3:
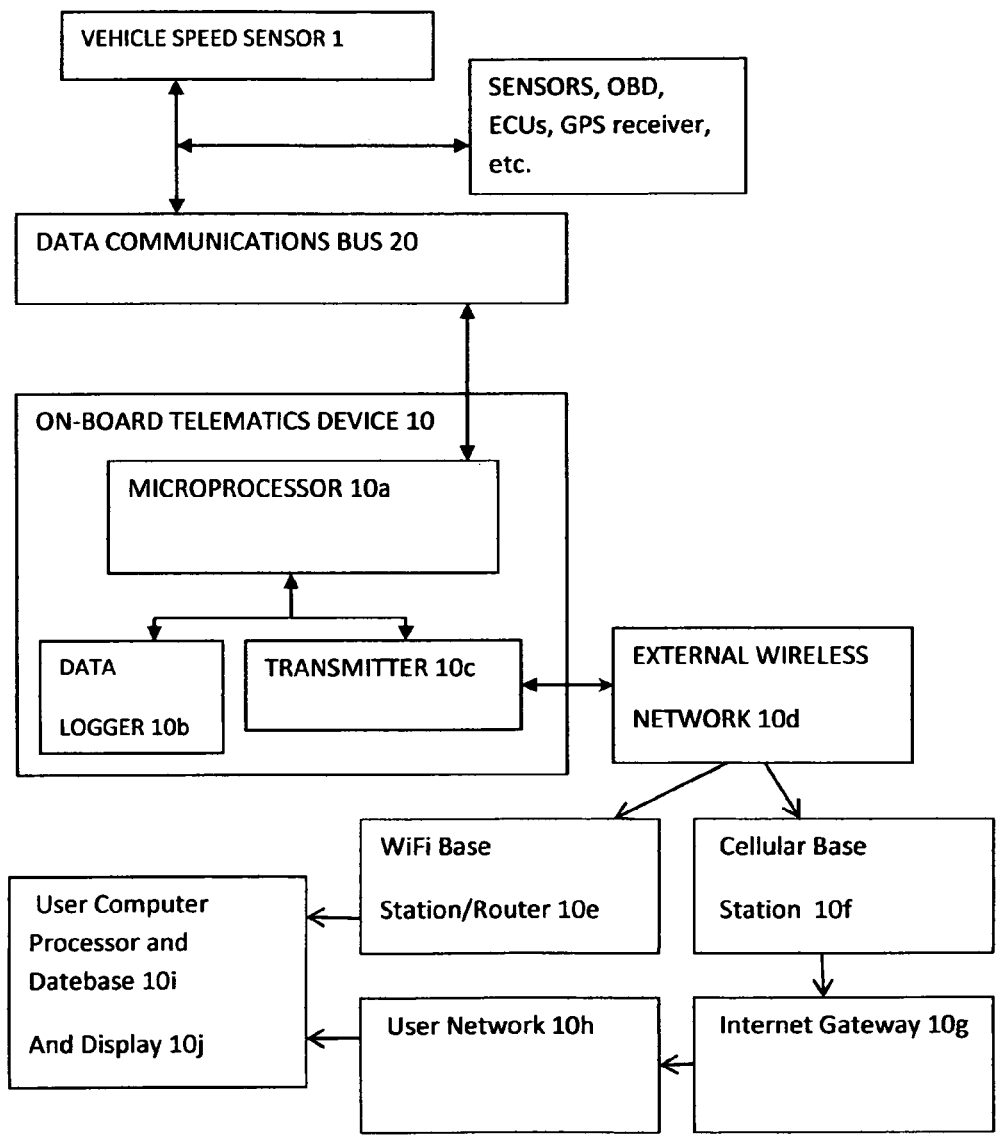
FIG. 3 is a representation of a wireless mediated telematics system embodiments according to the present invention.

Referring now to FIG. 3, there is illustrated a vehicular telematics system for remote processing of vehicular telematics data 10. Device 10 comprises a processor 10a for detecting instances of reverse operation of an associated vehicle (not shown) and a wireless transmitter 10c operatively connected to the processor 10a. The transmitter 10c is operable for transmitting processor-signaled instances of detected reverse operation of said vehicle. An extra-vehicular network 10d includes a co-operable receiver for receiving transmitter transmitted processor-signaled instances of detected reverse operation of said vehicle. For example, where transmitter 10c comprises a cellular modem, a co-operable receiver may comprise a cellular base station 10f—or where transmitter 10c is a WiFi transmitter (e.g. wireless router), receiver 10e is a wireless router.

A cellular modem based system may further comprise a computer network gateway 10g connected in operative relation with receiver 10f, to forward receiver-received instances of detected reverse operation of a telematics device 10 associated vehicle to a gateway-connected computer network 10h. A user computer 10i is further operatively connected to computer network 10h to receive and process instances of detected reverse operation forwarded through that network from gateway 10g.

Preferably the system includes a display 10j for displaying user computer-received and processed instances of detected reverse operation of a system-associated vehicle. More particularly, user computer 10i and display 10j are co-operable to differentially distinguishable representations of computer-received and processed instances of detected reverse operation of said vehicle through a machine to human interface. In a particularly preferred embodiment, that interface is a representational map including geographic vehicle location data, and computer-received and processed instances of detected reverse operation of a system associated vehicle and display 10j is operable to display such instances as differentially distinguishable overlays on the representational map.

In an application of the present invention, user computer 10i is an actuarial data processing device operable to process vehicular telematics data, including user computer-received and processed instances of detected reverse operation of a telematics device 10 associated vehicle and to process instances and/or frequency of instances of detected reverse operation of that associated vehicle to characterize an actuarially-based vehicle operation profile in relation to such instances.

In another application of the present invention user computer 10i is a vehicular telematics consolidating processing device operable to receive and process vehicular telematics data from a plurality of vehicles having associated therewith respective ones of on-board telematics devices 10, to process vehicular telematics data therefrom including user computer-received and processed instances of detected reverse operation of ones of that plurality of vehicles.

The various embodiments of the present invention described above have been presented by way of example and not limitation. It will be apparent to persons skilled in the relevant art(s) that various changes in form and detail can be made therein without departing from the spirit and scope of the present invention. Thus, the present invention should not be limited by any of the above-described example embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

The invention claimed is:

1. A device comprising a processor: that detects an autonomously sensed change in a vehicle's operational state: from an initial state characterized by a sensed vehicle speed equal to about 0, to an immediately succeeding vehicle state characterized by: sensed vehicle speed being greater than about 0;

and, verification from a reverse operating mode accelerometer that longitudinal vehicle speed is in a reverse direction, and presumptively signals said detected change of vehicle operational state as an instance of reverse operation of said vehicle.

2. The device according to claim 1 wherein said immediately succeeding vehicle state is further characterized by said sensed vehicle speed remaining greater than about 0 for a predetermined uninterrupted period of time.

3. The device according to claim 1 wherein said immediately succeeding vehicle state is further characterized by said sensed vehicle speed not exceeding a predetermined maximum speed.

4. The device according to claim 1 wherein said immediately succeeding vehicle state is further characterized by said sensed vehicle speed: remaining greater than about 0 for a predetermined uninterrupted period of time; and, not exceeding a predetermined maximum speed.

5. The device according to claim 4, wherein said processor calculates change in speed from said initial speed state of about 0 to speed in range greater than about 0 but less than said predetermined maximum for an uninterrupted predetermined period of time with an average negative acceleration, to detect said change in state.

6. The device according to claim 4, wherein said predetermined max speed is about 25 kph.

7. The device according to claim 4, wherein said predetermined minimum period of time is about 2 seconds.

8. The device according to claim 1 wherein said immediately succeeding vehicle state is further characterized by a reverse operating mode sensor verification is provided by a negatively-valued average sensed vehicle acceleration along the vehicle's longitudinal axis of travel.

9. A device according to claim 1 wherein said processor:
  a) uses logic state comparators to detect an autonomously sensed change in a vehicle's operational state:
    a. from an initial state characterized by sensed vehicle speed equal to about 0 being TRUE,
    b. to an immediately succeeding vehicle state characterized by:
      i. sensed vehicle speed greater than about 0 being TRUE; and,
      ii. a reverse operating mode sensor verification that longitudinal vehicle speed is in a reverse direction being TRUE,
  b) and, presumptively signals said detected change of vehicle operational state as an instance of reverse operation of said vehicle.

10. The device according to claim 9 wherein said immediately succeeding vehicle state is further characterized in a)b.i. with said sensed vehicle speed remaining greater than about 0 for a predetermined uninterrupted period of time being TRUE.

11. The device according to claim 9 wherein said immediately succeeding vehicle state is further characterized in a)b.i. with said sensed vehicle speed greater than about 0 and not exceeding a predetermined maximum speed, being TRUE.

12. The device according to claim 9 wherein said immediately succeeding vehicle state is further characterized in a)b.i. with said sensed vehicle speed remaining greater than about 0 for a predetermined uninterrupted period of time and not exceeding a predetermined maximum speed, being TRUE.

13. The device according to claim 1, wherein said processor initiates a new change of state detection cycle in response to detecting speed=about 0.

14. A vehicular telematics device according to claim 1, and further comprising a selected one or more of the group consisting of: a memory; and, a wireless transmitter operatively connected to said processor and responsive to said processor's detected change of vehicle operational state signals to respectively: record or transmit a detected instance of reverse operation of said vehicle.

15. The device according to claim 14, wherein said memory further records a serial log of said signals.

16. The device according to claim 15, wherein said memory records a serial log of said signals in conjunction with records of other contemporaneously-associated vehicle data.

17. The device according to claim 16, wherein said contemporaneously-associated vehicle data include geographic vehicle location data.

18. The device according to claim 17, wherein said geographic location data is GPS receiver sensed data from a device-associated GPS receiver.

19. The device according to claim 14, wherein said memory comprises a two tiered memory for recording vehicular telematics data from said processor at a first rate in a first log and at a second higher rate in a second log, and recording said detected instances of reverse operation in said second log.

20. The device according to claim 1, wherein said accelerometer is a tri-axial accelerometer.

21. The device according to claim 1, wherein said accelerometer is a digital accelerometer.

22. The device according to claim 1, wherein said accelerometer is a micro-electrical-mechanical sensor accelerometer.

23. A method for detecting instances of vehicle reverse operation comprising the steps of detecting an autonomously sensed change in a vehicle's operational state from an initial state characterized by a sensed vehicle speed equal to about 0 to an immediately succeeding vehicle state characterized by a sensed vehicle speed being greater than about 0; and, verifying from a reverse operating mode accelerometer that longitudinal vehicle speed is in a reverse direction, and presumptively signaling said detected change of vehicle operational state as an instance of reverse operation of said vehicle.

24. The method according to claim 23 wherein said detection includes said immediately succeeding vehicle state being further characterized by said sensed vehicle speed remaining greater than about 0 for a predetermined uninterrupted period of time.

25. The method according to claim 23 wherein said immediately succeeding vehicle state is further characterized by said sensed vehicle speed not exceeding a predetermined maximum speed.

26. The method according to claim 23 wherein said immediately succeeding vehicle state is further characterized by said sensed vehicle speed: remaining greater than about 0 for a predetermined uninterrupted period of time; and, not exceeding a predetermined maximum speed.

27. The method according to claim 23 wherein said immediately succeeding vehicle state is further characterized by a reverse operating mode sensor verification is provided by a negatively-valued average sensed vehicle acceleration along the vehicle's longitudinal axis of travel.

28. The method according to claim 23, wherein said accelerometer is a tri-axial accelerometer.

29. The method according to claim 23, wherein said accelerometer is a digital accelerometer.

30. The device according to claim 23, wherein said accelerometer is a micro-electrical-mechanical sensor accelerometer.

31. A method for displaying instances of detected reverse operation on a user computer comprising co-operably displaying computer-received and processed instances of detected reverse operation of said vehicle on a user computer and co-operable to display differentially distinguishable representations of computer-received and processed instances of detected reverse operation of said vehicle through a machine to human interface, and comprising the steps of detecting an autonomously sensed change in a vehicle's o rational state from an initial state characterized by a sensed vehicle speed equal to 0 to an immediately succeeding vehicle state characterized by a sensed vehicle speed being greater than about 0; and, verifying from a reverse operating mode accelerometer that longitudinal vehicle speed is in a reverse direction, and presumptively signaling said detected change of vehicle operational state as an instance of reverse operation of said vehicle.

32. The method according to claim 31 wherein said interface is displayed as a representational map including geographic vehicle location data, and user computer-received and processed instances of detected reverse operation of said vehicle are displayed as differentially distinguishable overlays on said representational map.

33. The method according to claim 31, wherein said accelerometer is a tri-axial accelerometer.

34. The method according to claim 31, wherein said accelerometer is a digital accelerometer.

35. The device according to claim 31, wherein said accelerometer is a micro-electrical-mechanical sensor accelerometer.

36. A method for actuarial data processing of vehicular telematics data, including user computer-received and processed instances of detected reverse operation of said vehicle, comprising processing computer-received instances and/or frequency of instances of detected reverse operation of said vehicle to characterize an actuarially-based vehicle operation profile in relation to said instances, and comprising the steps of detecting an autonomously sensed change in a vehicle's operational state from an initial state characterized by a sensed vehicle speed equal to about 0 to an immediately succeeding vehicle state characterized by a sensed vehicle speed being greater than about 0; and, verifying from a reverse operating mode accelerometer that longitudinal vehicle speed is in a reverse direction, and presumptively signaling said detected change of vehicle operational state as an instance of reverse operation of said vehicle.

37. The method according to claim 36, wherein said accelerometer is a tri-axial accelerometer.

38. The method according to claim 36, wherein said accelerometer is a digital accelerometer.

39. The device according to claim 36, wherein said accelerometer is a micro-electrical-mechanical sensor accelerometer.

40. A method for consolidating vehicular telematics devices from a plurality of vehicles employing a user computer having a vehicular telematics consolidating processing device to receive and process vehicular telematics data from a plurality of vehicles having associated therewith respective ones of said on-board telematics devices, and processing vehicular telematics data therefrom, including user computer-received and processed instances of detected reverse operation of ones of said plurality of vehicles, with said processor, and comprising the steps of detecting an autonomously sensed change in a vehicle's operational state from an initial state characterized by a sensed vehicle speed equal to about 0 to an immediately succeeding vehicle state characterized by a sensed vehicle speed being greater than about 0; and, verifying in from a reverse operating mode accelerometer that longitudinal vehicle speed is in a reverse direction, and presumptively signaling said detected change of vehicle operational state as an instance of reverse operation of said vehicle.

41. The device according to claim 40, wherein said accelerometer is a tri-axial accelerometer.

42. The device according to claim 40, wherein said accelerometer is a digital accelerometer.

43. The device according to claim 40, wherein said accelerometer is a micro-electrical-mechanical sensor accelerometer.

* * * * *